US012154407B2

(12) United States Patent
Weatherby et al.

(10) Patent No.: US 12,154,407 B2
(45) Date of Patent: Nov. 26, 2024

(54) MULTI-REEL NUDGE SKILL-BASED REDEMPTION GAME

(71) Applicant: Epic Tech, LLC, Suwanee, GA (US)

(72) Inventors: Robert Weatherby, Flowery Branch, GA (US); Steven Wesley Davis, Suwanee, GA (US); Troy Jungmann, Leander, TX (US)

(73) Assignee: Epic Tech, LLC, Suwanee, GA (US)

( * ) Notice: Subject to any disclaimer, the term of this patent is extended or adjusted under 35 U.S.C. 154(b) by 0 days.

(21) Appl. No.: 18/384,072

(22) Filed: Oct. 26, 2023

(65) Prior Publication Data

US 2024/0054854 A1 Feb. 15, 2024

Related U.S. Application Data

(63) Continuation of application No. 17/485,472, filed on Sep. 26, 2021, now Pat. No. 11,823,524, which is a continuation of application No. 16/544,589, filed on Aug. 19, 2019, now Pat. No. 11,158,155, which is a continuation of application No. 15/809,364, filed on Nov. 10, 2017, now abandoned, which is a continuation of application No. 14/315,153, filed on Jun. 25, 2014, now Pat. No. 9,846,985.

(60) Provisional application No. 61/839,144, filed on Jun. 25, 2013.

(51) Int. Cl.
*G07F 17/32* (2006.01)
*G07F 17/34* (2006.01)

(52) U.S. Cl.
CPC ...... *G07F 17/3213* (2013.01); *G07F 17/3265* (2013.01); *G07F 17/34* (2013.01)

(58) Field of Classification Search
CPC .... G07F 17/3213; G07F 17/34; G07F 17/326; G07F 17/3265
See application file for complete search history.

(56) References Cited

U.S. PATENT DOCUMENTS 8,574,059 B2 11/2013 Rodgers
8,662,986 B2 3/2014 Rodgers
8,777,737 B2 7/2014 LeMay
8,784,196 B2 7/2014 Little
8,905,836 B2 12/2014 Saunders
8,944,907 B2 2/2015 Carranza
8,979,639 B2 3/2015 Saunders
9,846,985 B2 12/2017 Weatherby
11,158,155 B2 10/2021 Weatherby
2003/0087688 A1 5/2003 Kato
2004/0048650 A1* 3/2004 Mierau ............... G07F 17/3265 463/20

(Continued)

*Primary Examiner* — Steve Rowland
(74) *Attorney, Agent, or Firm* — Baker Donelson; Carl M. Davis, II

(57) ABSTRACT

Aspects of the disclosure relate to a multi-reel skill-based redemption game. An indication of a user desire to participate in the skill-based redemption game is received. The user's account balance is decreased, and simulated reels are spun. Adjustment arrows are displayed for a subset of the plurality of simulated reels. The player selects a simulated reel and a direction of adjustment for the simulated reel. If the player's adjustment creates a winning pattern, the user is rewarded with an increased account balance. The user may also be provided a bonus amount for achieving a number of consecutive wins.

27 Claims, 7 Drawing Sheets

(56) References Cited

U.S. PATENT DOCUMENTS

| | | | | |
|---|---|---|---|---|
| 2005/0032571 | A1* | 2/2005 | Asonuma | G07F 17/3211 463/20 |
| 2006/0046830 | A1* | 3/2006 | Webb | G07F 17/3213 463/20 |
| 2006/0189377 | A1* | 8/2006 | Gomez | G07F 17/3244 463/20 |
| 2007/0117605 | A1* | 5/2007 | Ghaly | G07F 17/34 463/16 |
| 2008/0119260 | A1* | 5/2008 | Nores | G07F 17/34 463/20 |
| 2009/0131156 | A1* | 5/2009 | Acres | G07F 17/3255 463/25 |
| 2011/0065492 | A1* | 3/2011 | Acres | G07F 17/3227 463/43 |
| 2013/0288774 | A1* | 10/2013 | Kondo | G07F 17/34 463/20 |
| 2014/0057698 | A1 | 2/2014 | Rogers | |
| 2014/0066174 | A1 | 3/2014 | Rogers | |
| 2014/0248936 | A1* | 9/2014 | Basallo | G07F 17/3244 463/20 |
| 2014/0378206 | A1 | 12/2014 | Whetherby | |
| 2015/0045108 | A1 | 2/2015 | Caputo | |
| 2015/0105140 | A1 | 4/2015 | Carranza | |

* cited by examiner

MULTI-REEL NUDGE SKILL-BASED REDEMPTION GAME

CROSS-REFERENCE TO RELATED APPLICATION

This application claims the benefit of U.S. Provisional Application No. 61/839,144, filed Jun. 25, 2013, which is hereby incorporated herein by reference in its entirety.

BACKGROUND

Skill-based redemption games are typically games that require some level of skill in order to win. A winner of such a skill-based redemption game may be rewarded with points, credits, or other such designation. Accumulated points or credits may be exchanged for non-cash merchandise, such as small toys, novelties, gift cards, or other merchandise or services, depending on the jurisdiction in which the skill-based redemption game is located.

BRIEF DESCRIPTION OF THE DRAWINGS

Reference will now be made to the accompanying figures and diagrams, which are not necessarily drawn to scale. The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
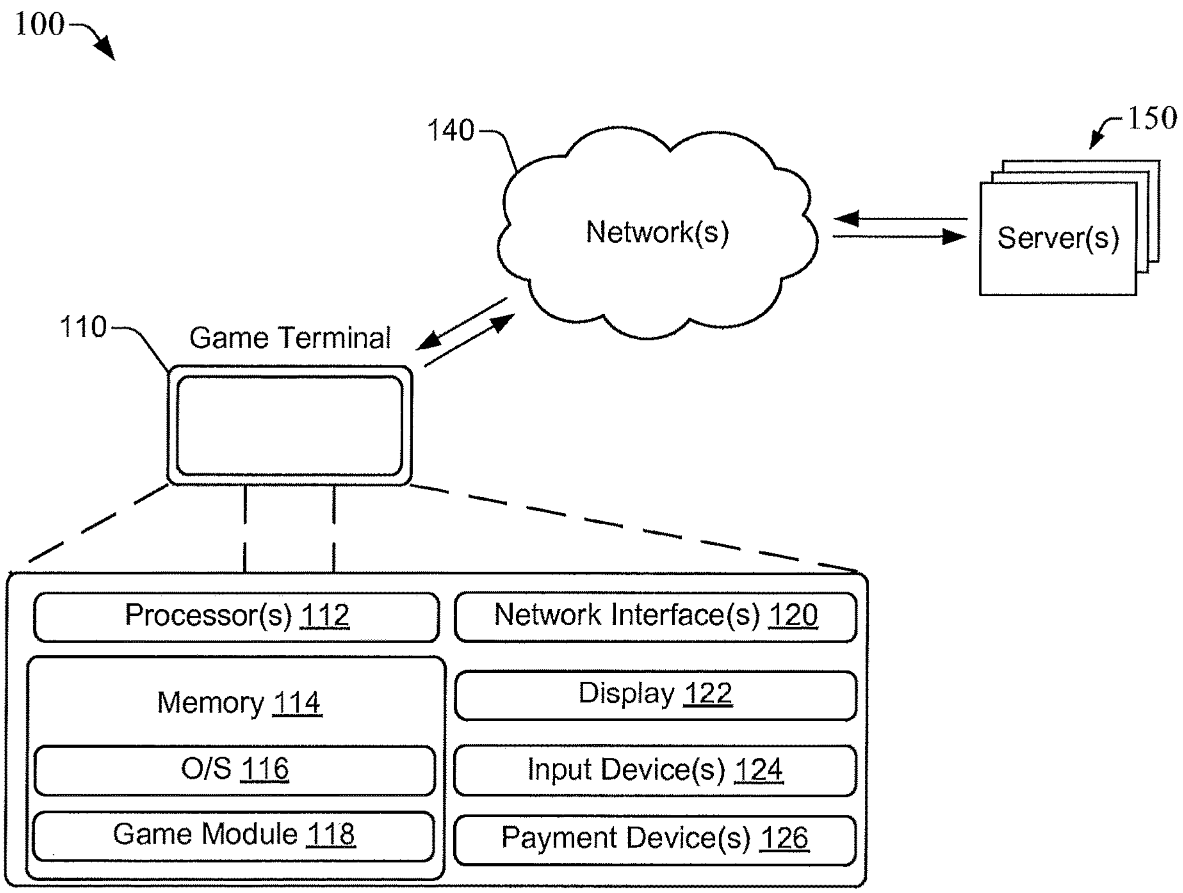
FIG. 1 illustrates a block diagram of a system for providing a skill-based redemption game according to one or more aspects of the disclosure.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "server" may refer to any computing device having a networked connectivity and configured to provide one or more dedicated services to clients, such as a mobile device. The services may include storage of information (e.g., data, metadata, and/or signaling) or any kind of information processing. One example of the server may include a web server hosting one or more web pages. Some examples of web pages may include social networking web pages. Another example of a server may be a cloud server that hosts web services for one or more computer devices.

Embodiments disclosed herein relate to providing a skill-based redemption game. In some embodiments, the skill-based redemption game is a matching game. Such a skill-based redemption game may be designed to display or otherwise render a plurality of simulated reels, including four or more simulated reels, for example, each of which has a plurality of symbols displayed or otherwise rendered thereon. A spin of the plurality of simulated reels can occur in response to a player choosing to play the skill-based redemption game. In certain embodiments, each of the plurality of simulated reels can begin spinning independently of one another, and stop after a certain period of time or a certain number of rotations. One or more of the plurality of simulated reels can spin (or rotate) faster or slower than another one or more of the plurality of simulated reels. In addition or in the alternative, one or more of the plurality of simulated reels can spin for a longer or shorter period than another one or more of the plurality of simulated reels. As such, in certain implementations, some or all of the plurality of simulated reels may stop at varying times. Upon or after each of the plurality of reels ceases to rotate (or spin), it can be determined if symbols that are rendered as part of the simulated reels match a predetermined combination of symbols. In certain implementations the predetermined combination of symbols may be referred to as a "winning combination of symbols," a "winning pattern of symbols" or "winning pattern." In response to a determination that the symbols match the winning combination of symbols, a win may be assigned to the player. In the alternative, in response to a determination that the symbols do not match the winning combination of symbols, the player may be required to make a decision to adjust one or more of the simulated reels in order to win the skill-based redemption game. Upon or after an adjustment of at least one of the simulated reels, it can be determined if second symbols rendered after the adjustment match a winning combination of symbols. In the affirmative case, a win may assigned to the player. In the negative case, the skill-based redemption game may end.

It should be appreciated that, in certain aspects, the variability introduced via the independent rotation of one, two, or more of the plurality of simulated reels associated with a skill-based game of this disclosure can provide a richer gaming experience to a player when compared to games in which each of a group of simulated reels spin and stop simultaneously. In addition, the flexibility afforded by the independent rotation of different blocks of one or more simulated reels (e.g., a block of three simulated reels and a block of two simulated reels) in the plurality of simulated reels can provide increased gaming flexibility, affording more sophisticated winning patterns and/or combinations of winning patterns associated with such a first block and other predetermined combination of symbols associated with such a second block.

FIG. 1 depicts an example of a system 100 for a skill-based redemption game in accordance with at least certain aspects of the disclosure. As illustrated, the system 100 may include a game terminal 110 having one or more computer processors 112, one or more memory devices 114 (referred to as "memory 114) storing an operating system 116 and game module 118, one or more network interfaces 120, a display 122, one or more input devices 124, and one or more payment devices 126, all of which may be in communication with each other. In should be appreciated that, in certain implementations, the display 122 and at least one of the input device(s) 124 can form a part of one or more input/output interfaces integrated and/or functionally coupled to the game terminal 110. A bus (e.g., an address bus, a control bus, a combination thereof, or the like) can be permit functional coupling (e.g., communicative couple, electrical coupling, or the like) between two or more of the functional elements that constitute the game terminal 110, e.g., processor(s) 112, memory 114, network interface(s) 120, display 122, input device(s) 124, and payment device(s) 126. The memory 114 also can include software interfaces, such as application programming interfaces (APIs) that can permit exchange of information between components of the game module 118 during execution thereof by at least one of the processor(s) 112. In one embodiment, the game terminal 110 may be a desktop computer; a laptop computer; an upright game cabinet; a portable computer, such as a tablet or a smartphone; a gaming console; a wearable computer; or the like.

The one or more computer processors 112 may comprise one or more cores and may be configured to access and execute (at least in part) computer-readable instructions stored in the memory 114. The one or more computer processors 112 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The game terminal 110 may also include a chipset (not depicted in FIG. 1) for controlling communications between the one or more processors 112 and one or more of the other components of the game terminal 110. The one or more processors 112 may also include one or more application-specific integrated circuits (ASICs) or application-specific standard products (ASSPs) for handling specific data processing functions or tasks.

The memory 114 may comprise one or more computer-readable storage media (CRSM). In some embodiments, the memory 114 may include non-transitory media such as random access memory (RAM), flash RAM, magnetic media, optical media (e.g., CD-ROM, DVD-ROM, BD-ROM), read-only memory ("ROM"), erasable programmable ROM ("EPROM"), electrically EPROM ("EEPROM"), solid-state media, and so forth. The memory 114 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 114 may store an operating system 116 that includes a plurality of computer-executable instructions that may be implemented by the one or more computer processor 112 to perform a variety of tasks to operate the interface(s) and any other hardware installed on the game terminal 110. The memory 114 may also store content that may be displayed by the game terminal 110 or transferred to other devices (e.g., headphones) to be displayed or played by the other devices. The memory 114 may also store content received from the other devices. The content from the other devices may be displayed, played, or used by the game terminal 110 to perform any necessary tasks or operations that may be implemented by the one or more computer processor 112 or other components in the game terminal 110.

The memory 114 may also store a game module 118 that includes a plurality of computer-executable instructions that may be executed by the one or more computer processor 112 to perform a variety of tasks, as will be further explained below.

The one or more network interface 120 may also comprise one or more communication interfaces or network interface devices to provide for the transfer of data between the game terminal 110 and another device (e.g., network server) via a network, such as network 140. The communication interfaces may include, but are not limited to: personal area networks (PANs), wired local area networks (LANs), wireless local area networks (WLANs), wireless wide area networks (WWANs), a combination thereof, or the like. The game terminal 110 may be coupled to the network via a wired or wireless connection.

The display 122 may include, but is not limited to, a liquid crystal display, a light-emitting diode display, or a cathode-ray tube display. Other such displays are possible as well. The display 122 may be used to show content to a user in the form of text, images, or video. In certain implementations, the display may also operate as a touch screen display that may enable the user to initiate commands or operations by touching or swiping the screen using certain finger or hand gestures.

The game terminal 110 also can include one or more input devices 124. As described herein, the one or more input devices 124 may include a touch screen input device coupled with or combined with the display 122 that enables an end-user (which also may be referred to as a player) to initiate commands by touching or otherwise tapping the screen or swiping a finger on the screen. The input device(s) 124 may also include a keyboard, numeric pad, mouse, trackball, one or more electromechanical buttons, a camera which detects gestures, or other input device.

The game terminal 110 may also include one or more payment devices 126. The one or more payment devices 126 may include a card reader to read payment and/or account information from a debit or credit card, including magnetic readers as well as wireless (e.g., radio frequency or near field communication) readers. The one or more payment devices 126 may also include a card reader to read a customer loyalty or other identification card. The one or more payment devices 126 may also include a cash acceptor for receiving paper and/or coin currency. The one or more payment devices 126 may also include a receipt printer and dispenser to provide a user or player with a receipt. In one embodiment, the one or more payment devices 126 may provide the user with a receipt containing a code (e.g., a 16-digit hexadecimal code, a bar code (such as a Quick Response (QR) code), a combination thereof, or the like) that a user or player can use to access an account on a separate device, computer, or game terminal 110. In one embodiment, the user may be required to input biographical or identifying information, such as a name, phone number, username, password, date of birth, email address, or other information, when playing a game on the game terminal 110. Such information may also be stored in memory 114, or communicated to at least one of the server(s) 150.

In one embodiment, game terminal 110 may include an upright game cabinet that houses display 122 for displaying a game, along with other components. The upright game cabinet housing may include a series of electromechanical buttons positioned on the upright game cabinet for use as a user interface or input device(s) 124 for controlling game play features such as commencing game play, pausing game play, terminating game play, etc.

System 100 may also include one or more servers 150. The one or more servers 150 may store information used by game terminal 110, such as but not limited to game module software, player data, or other such information. One or more game terminals 110 may at certain times (e.g., periodically or non-periodically) download or otherwise retrieve an updated game module 118 from at least one of the server(s) 150. In one embodiment, game terminals 110 may transmit reporting data, such as a number of games played or an amount paid out, to at least one of the server(s) 150. Game terminals 110 may also transmit diagnostic data to at least one of the server(s) 150. The game terminal 110 and the server(s) 150 may be functionally coupled (e.g., in communication) with each other through one or more networks 140.

As described herein, in certain embodiments, the game terminal 110 can include a game module 118, which may include instructions executed by at least one of the computer processor(s) 112 or other processing unit integrated into the game terminal 110 or functionally coupled thereto, and in response to execution, the game module 118 may cause the game terminal 110 to provide a skill-based redemption game to a user or game player in accordance with one or more aspects of this disclosure. As such, in at least certain aspects, execution of the instructions the embody or constitute the game module 118 can cause the game terminal 110 or one or more components thereof to implement one or more of methods disclosed herein (e.g., example method 600 and/or example method 700). The terms "user" and "player" are used interchangeably herein. In one example, the skill-based redemption game may display a plurality of simulated reels to the player. Each simulated reel can include a plurality of symbols, such as a club, pair of cherries, bell, or other such symbols. In one embodiment, the skill-based redemption game may display five simulated reels to the player. For instance, the plurality of simulated reels can form an array of five adjacent simulated reels. The game module 118 may also store one or more winning combinations of symbols and prize information corresponding to the winning combinations, as will further be described below. A winning combination of symbols may be referred to as a winning pattern of symbols or, more simply, a winning pattern. In one embodiment, game module 118 may be downloaded from at least one of the server(s) 150, and data associated with game module 118 may be stored on at least one of the server(s) 150.

Figure 2:
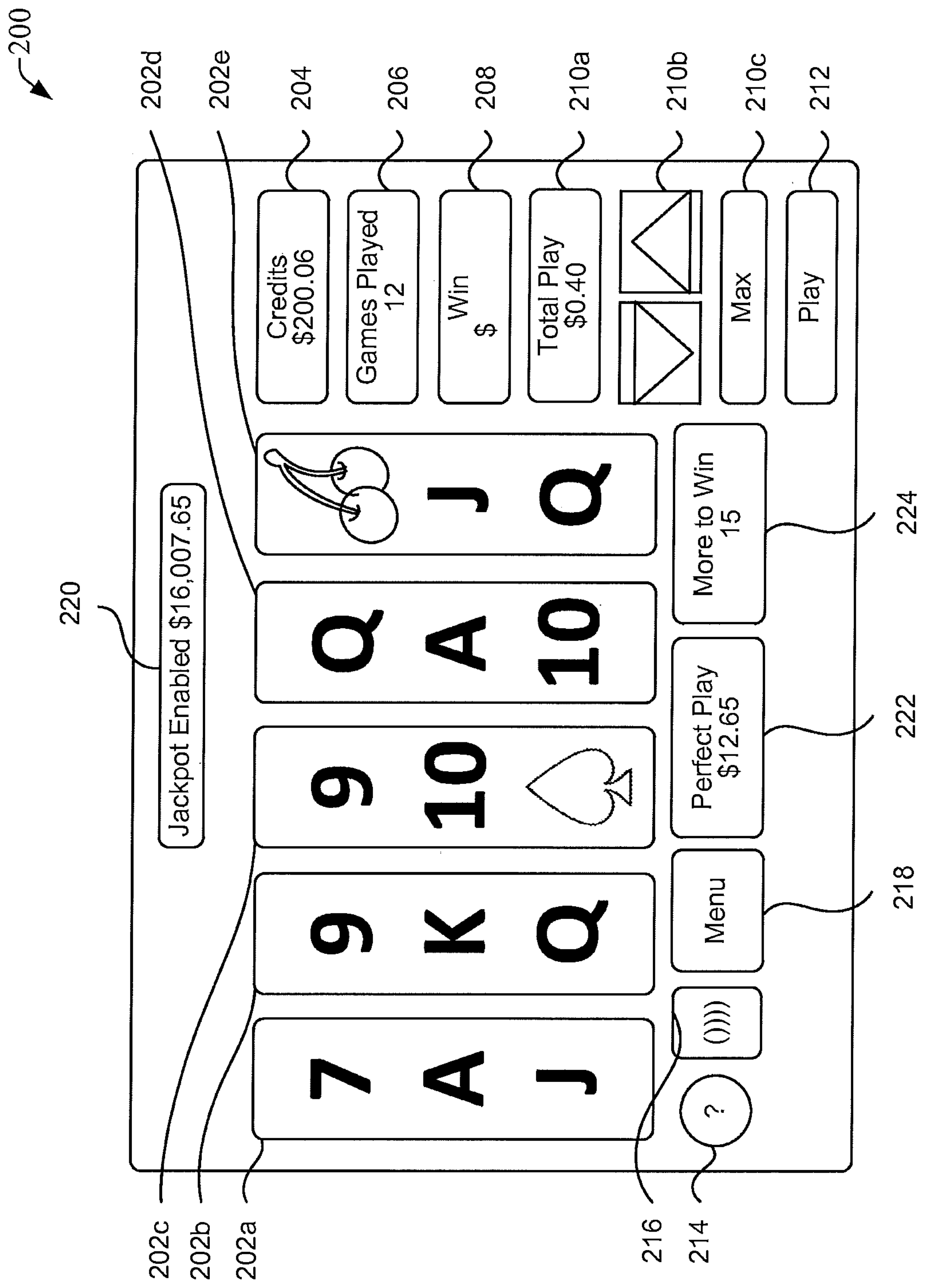
FIG. 2 illustrates an example of a skill-based redemption game according to one or more aspects of the disclosure.

FIG. 2 presents an example of a skill-based redemption game 200 that can be provided to a player in accordance with one or more aspects of the disclosure. Skill-based redemption game 200 may be provided by game module 118 of game terminal 110. The example of FIG. 2 may illustrate a starting point for the skill-based redemption game 200. As illustrated in FIG. 2, the example game 200 may display five simulated reels 202*a*-202*e*, along with an amount of money the player has contributed for game play 204 (e.g., available credits). The amount of money may be presented or otherwise rendered as monetary or non-monetary currency (such as credits, points, money, or other similar designation).

The example skill-based redemption game 200 may also display a number of games the player has played 206. Certain jurisdictions have limits on the value of prizes or rewards awarded by skill games. For example, one jurisdiction limits prizes to merchandise which has a wholesale value of $5.00 or less per single play of a game. Thus, the number of games the player has played 206 (also known as "hand count") may be used to track the number of games played to ensure that the player is not awarded more than $5.00 per game played.

The example game 200 may also display a "Win" amount 208, which may display the amount of money the player has won after a successful game. The example game 200 may also display an amount of credits used on the particular game 210*a*. Such an amount may be designated, in one embodiment, as "Total Play" or a similar designation. In one embodiment, the example game 200 may also display up and down arrows 210*b*, which in response to actuation may enable a player to adjust the amount of money or credits played or used on a particular game, as well as a "MAX" button 210*c* to allow the player to use the maximum amount permitted (by law or as desired by a provider of the example game 200) for a particular game. Further, the example game 200 may display a "Play" button 212 which initiates the start of a new game.

In one embodiment, the example game 200 also displays a help button 214, a volume adjustment button 216, and a menu button 218. In response to actuation or other form of interaction, the help button 214 (which is represented with a "?") may provide the player with instructions on how to play the skill-based redemption game 200, along with information related to winning patterns, rules, and other information. Volume adjustment button 216 may enable, in response to actuation or other form of interaction, the player to increase or decrease simulated sounds of the example game 200. Menu button 218 may enable, in response to actuation or other form of interaction, the player to adjust certain settings of the example game 200.

The example game 200 may also display a jackpot amount 220. Further, the example game 200 also may display a bonus amount 222 and bonus counter 224. In one embodiment, bonus amount 222 can be increased when a player has an unsuccessful game. Further, bonus counter 224 may be decremented when a player has a successful game. If the player has a certain number of consecutive successful games (e.g., 5, 10, 15, or any other number), the player may be rewarded with the bonus amount 222. Additionally or alternatively, the bonus counter 224 may be reset each time the player has an unsuccessful game.

After a player deposits coins, bills, tickets, or after a player swipes a card or otherwise pays to play the example game 200, the player begins a game by pressing or otherwise interacting with the "Play" button 212 (or other similar button or icon). Upon or after pressing or otherwise interacting with the button 212, the simulated reels 202*a*-202*e* can begin spinning independently of one another, and stop after a certain period of time or a certain number of rotations. In one embodiment, the example game 200 may cause one or more simulated reels 202*a*-202*e* to spin faster or slower, or for a longer or shorter period than another one or more of the simulated reels 202*a*-202*e*. In one example, each simulated reel 202*a*-202*e* may stop at varying times. In another example, some or all of the simulated reel 202*a*-202*e* may stop simultaneously or substantially simultaneously. The game terminal 110 can simulate the rotation of the simulated reels 202*a*-202*e*. As such, the game terminal 110, via at least one of the processor(s) 112, for example, can execute or otherwise implement the game module 118. Therefore, in one aspect, the game terminal 110 can simulate a rotation for each of the simulated reels 202*a*-202*e*, where each of the simulated rotations can span a predetermined period of time and/or can have a predetermined angular velocity (which can determine the rate of revolution of a simulated reel). In one embodiment, the example game 200 may display a "stop" button that enables the player to control when the simulated reels 202*a*-202*e* stop spinning, either individually or collectively. Additionally, upon pressing the button 212, the player's available credits may be reduced by the amount of credits used on that game.

Figure 3:
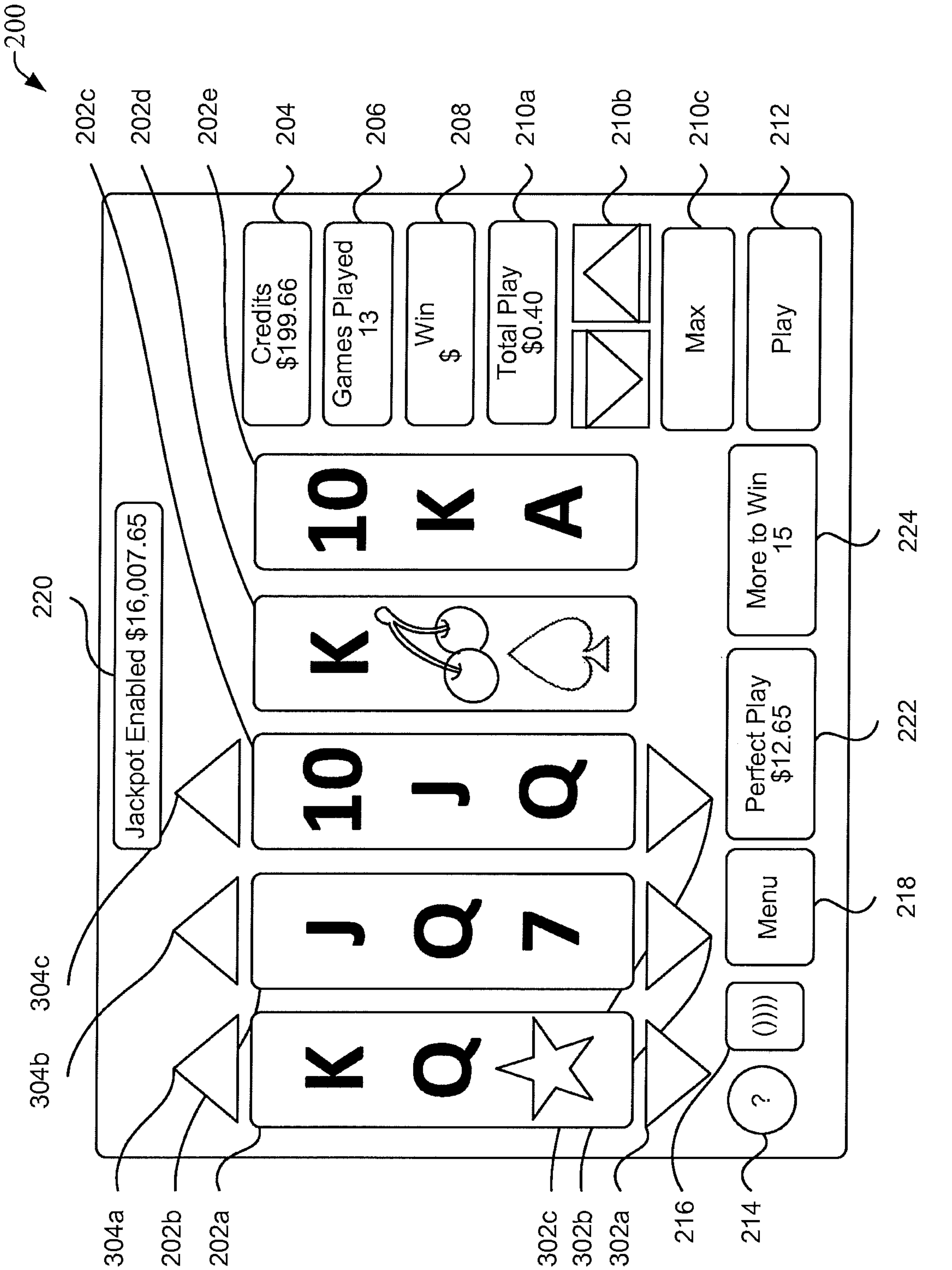
FIG. 3 illustrates a further example of a skill-based redemption game according to one or more aspects of the disclosure.

FIG. 3 is an example of skill-based redemption game 200 after the simulated reels 202*a*-202*e* have stopped spinning in accordance with one or more aspects of the disclosure. At this point in the game, the player must participate to win the skill-based redemption game. As illustrated in FIG. 3, after the simulated reels 202*a*-202*e* have stopped spinning, game module 118 may place three downward adjustment arrows 302*a-c* and three upward adjustment arrows 304*a-c* below and above simulated reels 202*a-c*, respectively. In one embodiment, each adjustment arrow adjusts the simulated reel one position, either downward or upward. In one embodiment, each adjustment arrow may adjust the simulated reel more than one position either downward or upward. In one embodiment, adjustment arrows are only placed for a subset of simulated reels, e.g., a first three simulated reels out of five simulated reels. Further, in one embodiment, the adjustment arrows may be always displayed, or displayed while the simulated reels are spinning, in addition to being displayed after the simulated reels stop spinning. In one embodiment, the downward adjustment arrows 302 may display a label such as "Lower", while the upward adjustment arrows 304 may display a label such as "Raise." In one embodiment, adjustment arrows may appear above and below a different set of reels for each game played by the player.

While adjustment of the position of a simulated reel is described in connection with reels 202*a*-202*c* and associated adjustment arrows, the disclosure is not so limited and other configurations of indicia or marking(s) can be rendered after a plurality simulated reels cease to spin or rotate or during spinning or rotation thereof. In one example, indicia and/or marking(s) associated with each of a subset of a plurality of simulated reels can be rendered during or after rotation of one or more of the plurality of simulated reels (e.g., reels 202*a*-202*e*). In certain implementations, as described herein, the subset of a plurality of simulated reels can include three simulated reels within an array formed by the plurality of simulated reels. For instance, the subset of the plurality of rotated simulated reels can form an array of three adjacent simulated reels—e.g., such a subset can include reels 202*a*, 202*b*, and 202*c* in FIG. 2. In another example, the subset of the plurality of rotated simulated reels can include three non-adjacent simulated reels. In other embodiments, the subset of the plurality of simulated reels can include more or less than three simulated reels. More generally, such a subject can include any number of simulated reels less than or equal to the total number of simulated reels in the plurality of simulated reels.

Figure 4:
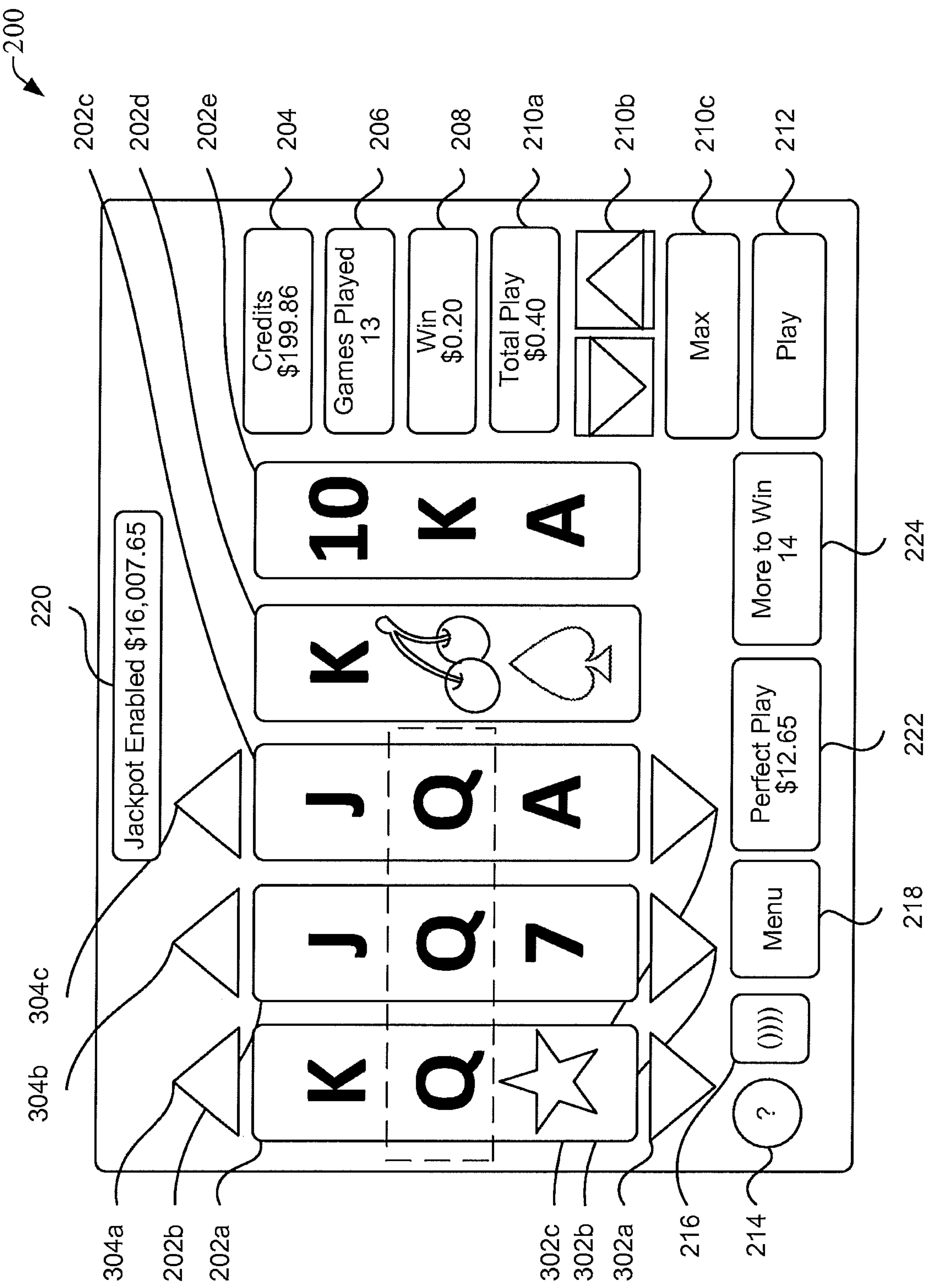
FIG. 4 illustrates a further example of a skill-based redemption game according to one or more aspects of the disclosure.
Figure 5:
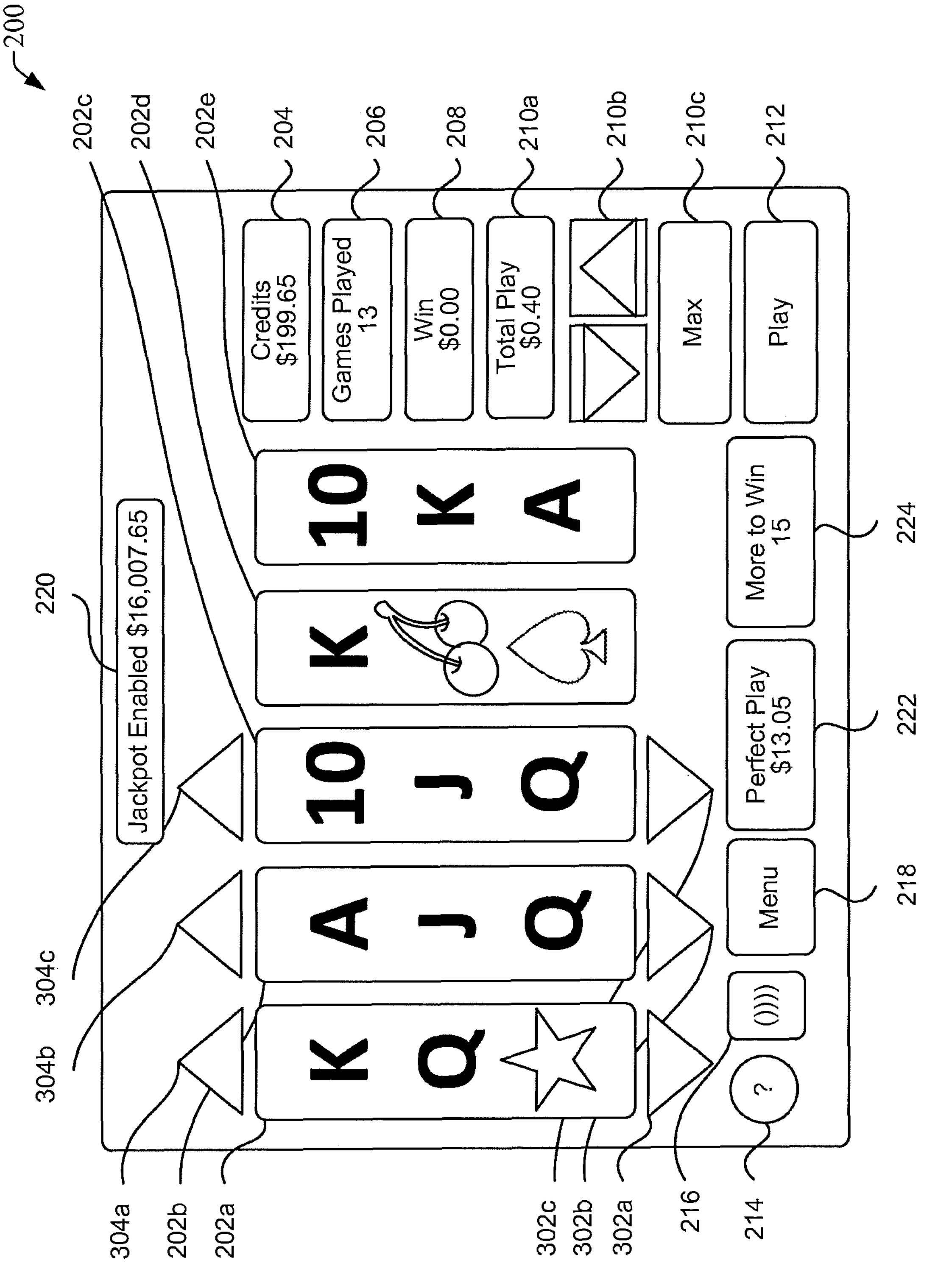
FIG. 5 illustrates a further example of a skill-based redemption game according to one or more aspects of the disclosure.

In certain embodiments, in order to win the game in the example of FIG. 3, the player selects which simulated reel 202*a*, 202*b*, or 202*c* to adjust or nudge, and in which direction to nudge the selected reel. If the selection and adjustment creates a winning pattern, such as a horizontal line with three consecutive symbols in the center row of the reels, the player wins the game. Thus, in the example of FIG. 3, the player may adjust simulated reel 202*c* upward using adjustment arrow 304*c*, the result of which is illustrated in FIG. 4. In another example, the player may adjust simulated reel 202*b* downward using adjustment arrow 302*b*, the result of which is illustrated in FIG. 5.

In one embodiment, the player may select the adjustment arrow 302*a-c* or 304*a-c* by pressing a player's finger to the adjustment arrow or otherwise interacting with such an arrow, if the game terminal 110 is equipped with a touch input device. In one embodiment, the player may use a keyboard or mouse to select the adjustment arrow to be replaced.

Further, in one embodiment, an arrow or other visual indication may be displayed to direct the player's attention toward the adjustment arrows. For example, the adjustment arrows may change in size or may be animated to direct the player's attention toward the adjustment arrows. A further visual indication may instruct the player to select one of the adjustment arrows to create a winning pattern.

In one aspect, after the player selects an adjustment arrow corresponding to a simulated reel and a direction of adjustment, the example game 200 may illustrate a win or loss. FIG. 4 illustrates an example of a win in response to the player's selection of adjustment arrow 304*c* to nudge reel 202*c* upward one space, thereby displaying three consecutive "Q" symbols in the center row, which may be a winning pattern. In the example of FIG. 4, the win may be indicated to the user by outlining the winning pattern, or by displaying a win line across the simulated reels 202*a*-202*e*. Other indications of a player win may be used as well. A win amount may be rendered (e.g., displayed) in area 208 (in this example, $0.20), and the player's available credits 204 may be increased by the win amount 208. The number of games played 206 may also be incremented after the player's win.

If the player selects an adjustment arrow corresponding to a different simulated reel, and the adjustment does not create a winning pattern, the player can lose the game. Alternatively, if the player selects an adjustment arrow corresponding to a different direction of adjustment, and such an adjustment does not create a winning pattern, the player can lose the game. FIG. 5 is an example of a loss. In the example of FIG. 5, the player has selected to adjust simulated reel 202*b* downward by selecting adjustment arrow 302*b*. As the simulated reels 202*a*-202*e* do not display three consecutive symbols in the center row, and no other winning pattern is created after the adjustment, the player does not win the game. A visual indication may be provided to notify the player of an unsuccessful game. For example, the illustrated game 200 may display the correct reel for adjustment or the correct direction of adjustment. In addition, the example game 200 may display text such as "Try Again" or similar encouragement to the player. The number of games played 206 may be incremented after the player's loss.

It should be appreciated that although FIG. 4 displays a three consecutive symbol winning pattern, other winning patterns are possible and contemplated in this disclosure. For example, four consecutive symbols displayed on the simulated reels, or five consecutive symbols displayed on the simulated reels may also be a winning pattern. Diagonal consecutive symbols may also correspond to a winning pattern. In one embodiment, the greater the number of consecutive symbols, the higher the winning amount. Winning combinations may be presented to the user on the main game screen, on an upright game cabinet enclosing game terminal 110, or in a help or similar screen. For example, as illustrated in FIG. 2, the winning combinations may be displayed by selecting help button 214.

Such a redemption game requires skill, as the player must choose both which reel to adjust, and which direction (up or down) to adjust the reel. Accordingly, multiple decisions must be made. An understanding of matching and spatial relationships may be required to successfully play. A player that nudges an incorrect reel, or nudges a correct reel in an incorrect direction cannot win the game. In one embodiment, the skill-based redemption game may not allow a winning combination of reel symbols to appear without interaction from a player. In such an embodiment, the player can only win through the use of skill, and not through chance alone. Further, in one embodiment, multiple adjustments may be necessary to create a winning pattern, thereby requiring additional skill. For example, the skill-based redemption game may require the user to adjust two simulated reels, or three simulated reels. Multiple winning patterns may be possible, and the player may be awarded a greater or lesser amount of credits based on the winning pattern created after any adjustments.

In one embodiment, compensation in lieu of additional credits or in addition to additional credits may be provided. For example, a player may be provided with an opportunity to play a bonus round. In another embodiment, a player may be provided with one or more free replays.

In one embodiment, a winning pattern may not be possible with the symbols displayed on the simulated reels 202*a*-202*e* after any adjustment. In such an example, the player may be provided the opportunity to play a subsequent game.

In one embodiment, the player may be rewarded for winning consecutive games, and may also be provided with an opportunity to win back money or credits lost as a result of a lost game. For example, as described above, bonus amount 222 may be increased by the amount played for each game a player loses. Thus, if a player incorrectly nudges a simulated reel, and wagered $0.30 on that game, the bonus amount 222 may be increased by $0.30. Additionally, each time a player wins a game, the bonus counter 224 may be decremented. If the player wins a second consecutive game, the bonus counter 224 is further decremented. When the bonus counter reaches zero, the player may be rewarded with the bonus amount 222. If the player loses a game, however, the bonus counter 224 may be reset. In one embodiment, the bonus counter and bonus amount are not changed after any game which cannot be won. That is, if no simulated reel can be nudged to create a winning pattern, the bonus counter is not decremented or reset, and the bonus amount is not increased.

Figure 6:
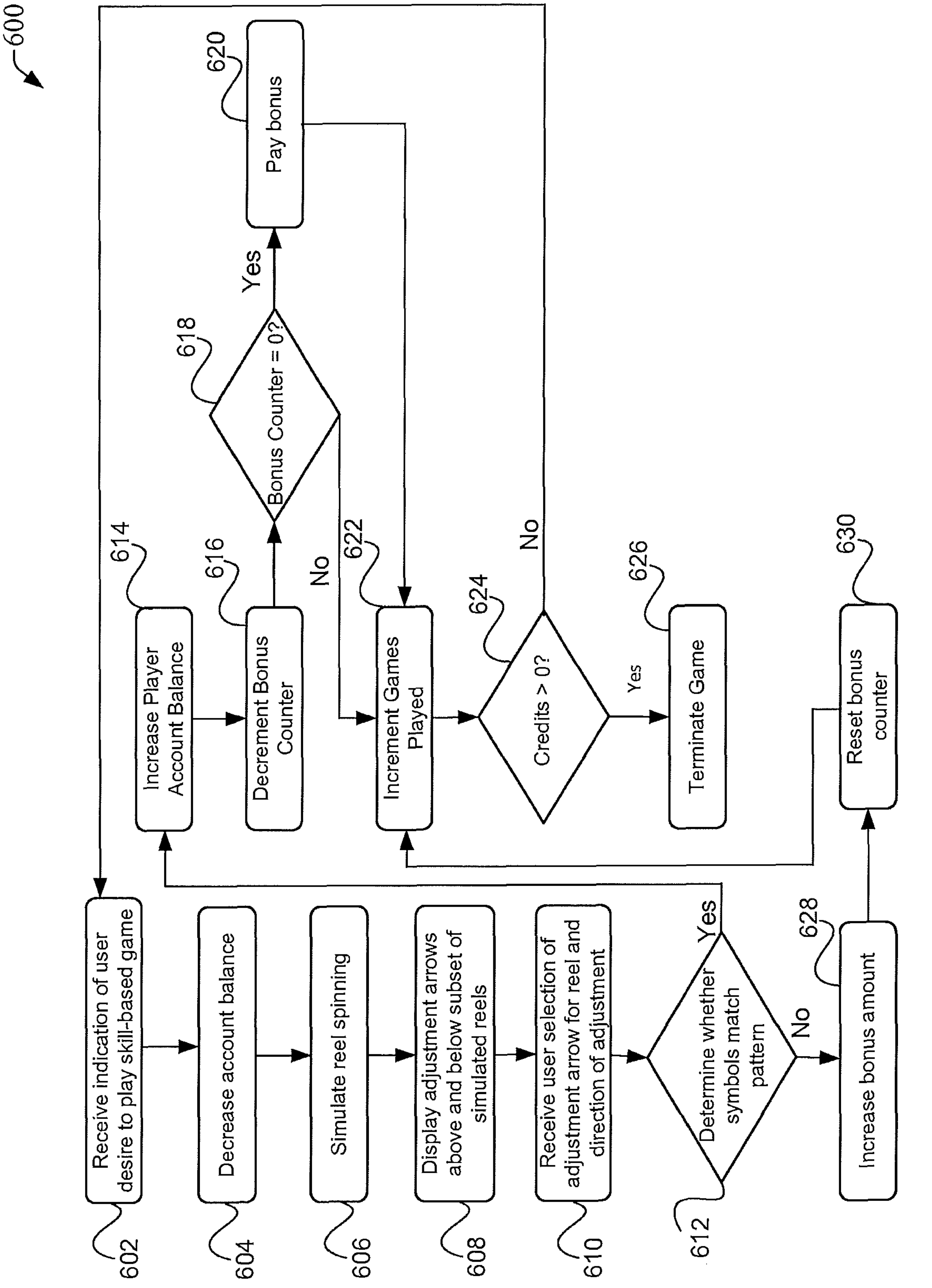
FIG. 6 illustrates a flow diagram of an example skill-based redemption game according to one or more aspects of the disclosure.
Figure 7:
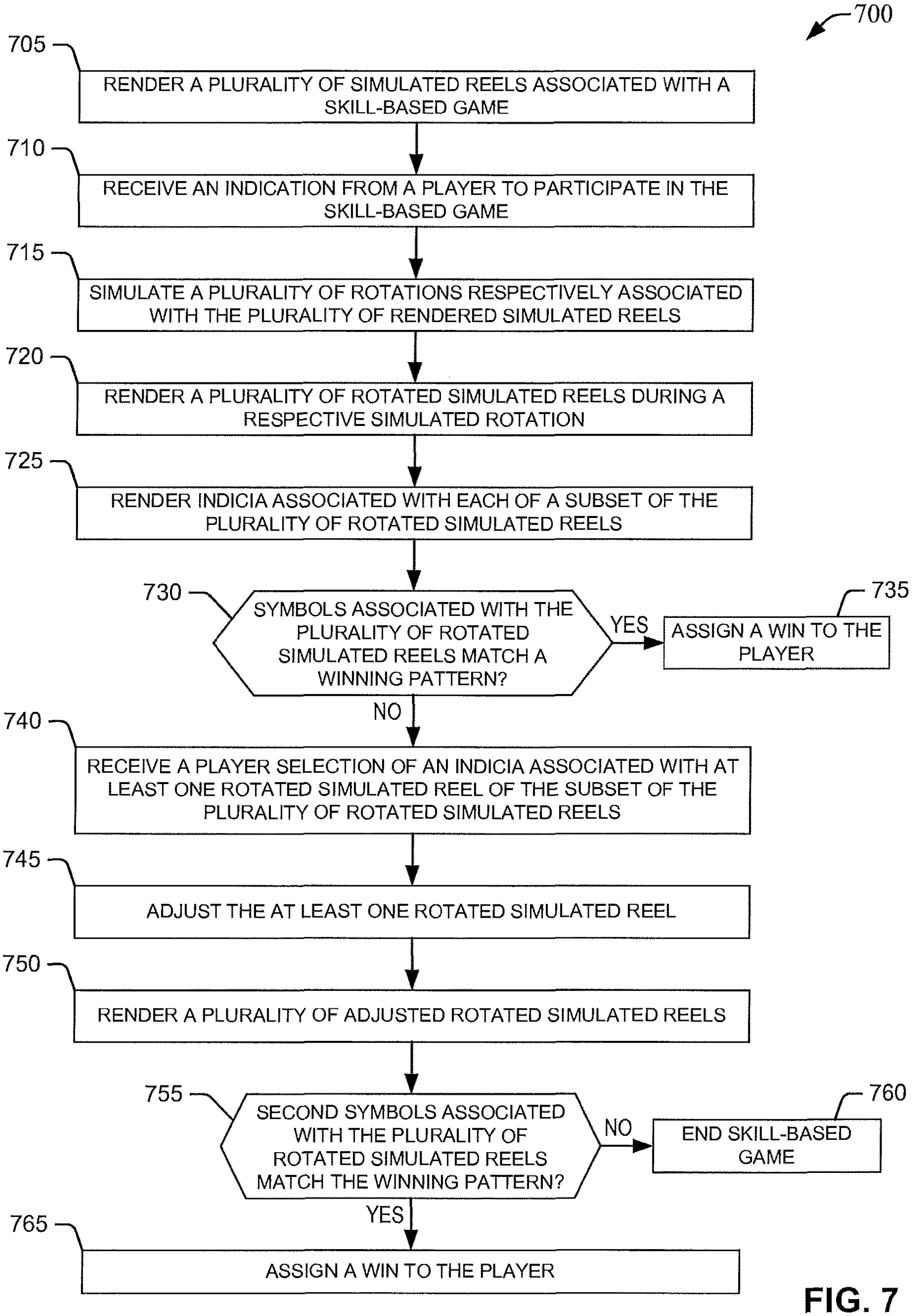
FIG. 7 illustrates a flow diagram of another example skill-based redemption game according to one or more aspects of the disclosure.

In view of the aspects described herein, example methods for multi-reel nudge skill-based game that can be implemented in accordance with the disclosure can be better appreciated with reference, for example, to the flow diagrams in FIGS. 6-7. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more additional games and/or one or more features described herein.

It should be appreciated that the methods in accordance with this disclosure can be retained on an article of manufacture, or computer-readable medium, to permit or facilitate transporting and transferring such methods to a computing device (such as a game terminal as described herein, or other gaming platforms including a blade computer, a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more of the disclosed methods. The code instructions can provide a computer-executable or machine-executable framework to implement the methods described herein.

FIG. 6 illustrates a flow diagram of an example method 600 for a skill-based redemption game according to one or more aspects of the disclosure. The example method 600 may be implemented, in one embodiment, by the game terminal 110 via, at least in part, the game module 118. For instance, one or more of the processor(s) 112 can execute the game module 118 and in response, implement one or more of the blocks in the subject example method.

At block 602, an indication of a user's desire to participate in or play the skill-based redemption game may be received. In one embodiment, the indication may be received as a result of a player pressing or otherwise selecting a "Play" button. In one embodiment, the player may choose an amount to wager prior to indicating his or her desire to play the skill-based redemption game. In one embodiment, the player inserts money and/or add credits to at least one of the payment device(s) 126 before pressing the "Play" button. In one aspect, providing the money and/or credits can be a requirement prior to initiating game play.

At block 604, an account balance associated with the user or player may be decreased or debited. In one embodiment, the account balance is decreased according to the amount wagered by the player. In one embodiment, the account balance may not be decreased if the player has received a bonus play or a free replay.

At block 606, a spin, or rotation, of the one or more simulated reels (e.g., five reels) may be simulated, for example, by game module 118 in response to execution by at least one of the processor(s) 112. For example, simulating a spin, or rotation, may include moving the symbols for a particular simulated reel according to the symbols on such a simulated reel, similar to a physical game reel. Simulating the spin, or rotation, of the one or more simulated reels (e.g., five reels) can include rendering one or more symbols in each of the one or more simulated reels during and/or after the spin, or rotation, simulation.

At block 608, adjustment arrows may be displayed above and below a subset of the one or more simulated reels. For example, in one embodiment, the one or more simulated reels can include five simulated reels and adjustment arrows may be displayed above and below a first three simulated reels out of the five simulated reels. In another embodiment, adjustment arrows may be rendered (e.g., displayed) above and below a first, third, and fifth simulated reels out of five simulated reels, or any other subset of the displayed simulated reels. In one embodiment, the adjustment arrows may be an electromechanical button on an upright game cabinet enclosing the game terminal 110, and may light up or otherwise activate after the simulated reels have spun. In one embodiment, a visual indication may be provided to draw the player's attention to the adjustment arrows.

At block 610, a user selection of an adjustment arrow corresponding to a reel and direction of adjustment may be received. For example, the player may select an adjustment arrow by actuating (e.g., pressing his or her finger on) or otherwise interacting with the selected arrow, if the game terminal is equipped with a touch screen input device. Alternatively or additionally, the player may use an input device, such as a keyboard, mouse, or other input device, to select the adjustment arrow. Further, the player may use an electromechanical button on an upright game cabinet enclosing the game terminal 110 in order to select the reel and direction of adjustment.

At decision block 612, a determination may be made as to whether the symbols rendered (e.g., displayed) on the plurality of reels, after the player's adjustment, match a winning pattern, such as a three consecutive symbol pattern. In response to a determination that the rendered (e.g., displayed) symbols match the winning pattern, the example method 600 can proceed to block 614. In the alternative, in response to a determination that the rendered (e.g., displayed) symbols do not match the winning pattern, the example method 600 can proceed to block 628.

At block 614, the player's account balance may be increased by a win amount corresponding to the winning pattern. In one embodiment, different winning combinations may be associated with different win amounts. Further, the player's account balance may be increased based on patterns of symbols on the simulated reels, or according to one or more win lines across the symbols on the simulated reels. The win amount may be rendered (e.g., displayed) on the game terminal, for example, in area 208.

At block 616, a bonus counter may be decremented by one. As described above, the bonus counter may be decremented each time the player wins a game. At decision block 618, a determination is made as to whether the bonus counter equals zero or meets another threshold. If so, method 600 can proceed to block 620, and the bonus may be paid to the player. Thus, for example, if the player has successfully won 15 games in a row, the player may be eligible to receive the bonus amount and the player's account balance may be increased by the bonus amount. After paying a bonus to the player, the example method 600 can proceed to block 622. If the bonus counter does not equal zero or does not meet a threshold at decision block 618, method 600 proceeds directly to block 622.

At block 622, a number of games played may be incremented by one. The example method 600 then can proceed to decision block 624, where a determination may be made as to whether the account balance associated with the player is greater than zero. In response to a determination that the player's account balance is not greater than zero, the example method 600 may proceed to block 626, where the game may be terminated, and the player may no longer play the game. In the alternative, if a determination is made at decision block 624 that the player's account balance is greater than zero (e.g., the account balance has sufficient credits), the example method 600 returns to block 602.

As described herein, in a game scenario in which the rendered (e.g., displayed) symbols do not match a winning pattern after the player's selected adjustment, method 600 proceeds to block 628. At block 628, a bonus amount may be increased by an amount wagered by the player. This may allow the player to recoup any lost money or credits, if the player successfully wins the bonus amount at a later time. The example method 600 then can proceed to block 630, where the bonus counter is reset to an initial value. Method 600 then proceeds to block 622, and method 600 continues as described above.

At any point in the operation of the example method 600, the player may terminate game play. For example, the player may select the menu button 218, and choose an option in the menu in order to terminate game play.

FIG. 7 illustrates a flow diagram of an example method 700 for a skill-based redemption game according to one or more aspects of the disclosure. The example method 700 may be implemented (e.g., executed), in one embodiment, by the game terminal 110 via, at least in part, the game module 118. For instance, one or more of the processor(s) 112 can execute the game module 118 and in response, implement one or more of the blocks in the subject example method.

At block 705, a plurality of simulated reels associated with a skill-based game can be rendered. As described herein, in one aspect, each simulated reel can include a plurality of symbols, and the plurality of simulated reels can include comprising at least four simulated reels. In one example, the skill-based game can be or can include a matching game, having one or more winning patterns of symbols in which, for example, numerous symbols may be matching symbols as part of a winning pattern. As described herein, the game terminal 110 or a computing device that implements the subject example method can render the plurality of simulated reels via the display 122 or any other suitable input/output interface.

At block 710, an indication from a player to participate in the skill-based game my be received by the game terminal 110 or the computing device that implements the subject example method. An input device, such as one of the input device(s) 124, can receive such an indication. The indication can be received as analog information and/or digital information.

At block 715, a plurality of rotations respectively associated with the plurality of rendered simulated reels can be simulated. It can be appreciated that such simulations can yield a plurality of simulated rotations, where each of the plurality of simulated rotations can span a predetermined period of time and/or can have a predetermined angular velocity. As such, different simulated reels can appear as spinning at different rates and/or can stop spinning at different instants. The plurality of simulated reels can form or can be rendered as an array, such as the five-reel array formed by simulated reels 202*a*-202*e*. In one embodiment, the predetermined period of a simulated rotation associated with a rotated simulated reel can increase with the position of the rotated simulated reel within the array. Accordingly, in example, reel 202*a* can stop its rotation before reel 202*b*, which in turn can stop rotating before reel 202*c*, which can stop rotating prior to reel 202*d* stopping, which can occur prior the stopping of the reel 202*e*. In another embodiment, the predetermined period of a simulated rotation associated with a rotated simulated reel can decrease as the position of the rotated simulated within the array increases.

At block 720, the plurality of rotated simulated reels during a respective simulated rotation can be rendered. In can be appreciated that rendering the plurality of rotated simulated reels can simulate the spinning of each of the simulated reels.

At block 725, indicia or marking(s) associated with each of a subset of the plurality of rotated simulated reels can be rendered. In one embodiment, the plurality of simulated reels rendered at block 705 can form an array of five adjacent simulated reels, and the subset of the plurality of rotated simulated reels can include three simulated reels within the array. In one example, the subset of the plurality of rotated simulated reels can form an array of three adjacent simulated reels. For instance, such a subset can include reels 202*a*, 202*b*, and 202*c* in FIG. 2. In another example, the subset of the plurality of rotated simulated reels can include three non-adjacent simulated reels. Such indicia can be rendered after the rendering at block 720 and prior to one or more of the plurality of rotated simulated reels stops. In one aspect, each of the rendered indicia or marking(s) can represent a direction of adjustment of a position of a respective rotated simulated reel.

At block 730, it can be determine if symbols associated with the plurality of rotated simulated reels match a winning pattern of symbols. In one embodiment, the winning pattern can be embodied in or can include a linear pattern across the plurality of simulated reels. The linear pattern can include a set of matching symbols associated with the subset of the plurality of rotated simulated reels, and a predetermined combination of symbols in a row spanning a second subset of the plurality of rotated simulated reels. In one example such a second subset can include reels 202*d* and 202*e* in FIG. 2. In response to ascertaining that the symbols match the winning pattern of symbols, a win may be assigned to the player in accordance with various aspects described herein at block 735.

In addition, in response to ascertaining that the symbols do not match the winning pattern of symbols, flow of the subject example method 700 can proceed to block 740, at which a player selection of an indicia associated with at least one rotated simulated reel of the subset of the plurality of rotated simulated reels can be received. An input device of the game terminal 110 or the computing device that implements the subject example method can receive such a selection. As described herein, the input device can embody or can constitute a display terminal configured to respond to physical interaction with the player (e.g., taps, touches, swipes, or the like) or to gestures associated with the player.

At block 745, the at least one rotated simulated reel can be adjusted based at least on the received user selection of the indicia. As described herein, in one embodiment, adjusting the at least one rotated simulated reel can include nudging the at least one rotated simulated reel upwards at least one space. In addition or in the alternative, adjusting the at least one rotated simulated reel can include nudging the at least one rotated simulated reel downwards at least one space.

At block 750, a plurality of adjusted rotated simulated reels can be rendered. In one aspect, the display device or interface that renders the plurality of simulated reels at block 705 can render the plurality of adjusted rotated simulated reels.

At block 755, it can be determined if second symbols associated with the plurality of adjusted rotated simulated reels match the winning pattern of symbols. In response to ascertaining the second symbols does not match the winning pattern of symbols, the skill-game can end at block 760. In the alternative, in response to ascertaining that the second symbols match the winning pattern of symbols, a win may be assigned to the player at block 765.

It should be appreciated that game play associated with the skill-based game of the example method 700 can end in response to implementation of any of blocks 735, 760, or 765. In addition, at any point in the operation of the example method 700, the player may terminate game play. For example, the player may select the menu button 218, and choose an option in the menu in order to terminate game play.

Certain embodiments of the present disclosure are described herein with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

Any software module incorporating the game software may contain a source program, executable program (e.g., object code), script, and/or any other entity comprising a set of instructions to be performed. In the case of a source program, the program may be translated via a compiler, assembler, interpreter, or the like, which may or may not be included within the memory, so as to operate properly in connection with the operating system. Furthermore, the game software can be written as an object oriented programming language, which has classes of data and methods, or a procedure programming language, which has routines, subroutines, and/or functions, for example but not limited to, C, C++, Pascal, Basic, Fortran, Cobol, Perl, Java, ASP, and Ada. In operation, a processor may be configured to execute software stored within memory, to communicate data to and from the memory, and to generally control operations of the game device as directed by the software. The game software and operating system, in whole or in part, may be read by the processor, may be buffered by the processor, and then executed.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

As used in this application, the terms “component,” “system,” “interface,” “unit,” “module,” and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processor, application, and/or other programming components. The terms “component,” “system,” “interface,” “unit,” and “module,” can be utilized interchangeably and can be referred to collectively as functional elements.

As utilized in this disclosure, the term “processor” can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units.

In addition, in the present specification and annexed drawings, terms such as “store,” “storage,” “data store,” “data storage,” “memory,” “repository,” and substantially any other information storage component relevant to the operation and functionality of a component of the disclosure, refer to “memory components,” entities embodied in a “memory,” or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:

rendering, by a game terminal, a plurality of simulated reels associated with a skill-based game, each simulated reel comprising a plurality of symbols;

receiving, by the game terminal, an indication from a player to participate in the skill-based game;

simulating, by the game terminal, a plurality of rotations respectively associated with the plurality of rendered simulated reels, each of the plurality of simulated rotations spanning a predetermined period of time and having a predetermined angular velocity;

rendering, by the game terminal, the plurality of rotated simulated reels during a respective simulated rotation;

rendering, by the game terminal, indicia associated with at least one of the plurality of rotated simulated reels, said indicia comprising a first directional indicia that represents a first direction of adjustment of a position of said at least one rotated simulated reel and a second directional indicia that represents a second direction of adjustment of the position of said at least one rotated simulated reel;

determining, by the game terminal, if symbols associated with the plurality of rotated simulated reels match a winning pattern of symbols;

assigning, by the game terminal, a win to the player in response to ascertaining that the symbols match the winning pattern of symbols, and in response to ascertaining that the symbols do not match the winning pattern of symbols, receiving, by the game terminal, a player selection of one of the directional indicia associated with said at least one rotated simulated reel of the plurality of rotated simulated reels, adjusting, by the game terminal, the at least one rotated simulated reel based on the received user selection of the one of the directional indicia;

rendering, by the game terminal, a plurality of adjusted rotated simulated reels;

determining, by the game terminal, if second symbols associated with the plurality of adjusted rotated simulated reels match the winning pattern of symbols and upon determining the symbols associated with the plurality of adjusted rotated simulated reels do not match a winning pattern of symbols, adding to a bonus amount a value based on a wager amount of the player for play of the skill-based game.

2. The method of claim 1, wherein the plurality of simulated reels forms an array and the predetermined period increases with the position of a rotated simulated reel within the array.

3. The method of claim 1, wherein the plurality of simulated reels forms an array and the predetermined period decreases as the position of a rotated simulated within the array decreases.

4. The method of claim 1, wherein the plurality of simulated reels forms an array of five adjacent simulated reels, and wherein the symbols within the array are arranged in three rows and five columns.

5. The method of claim 1, wherein the plurality of simulated reels forms an array of five adjacent simulated reels, and wherein a subset of the plurality of rotated simulated reels comprises three simulated reels within the array.

6. The method of claim 5, wherein the subset of the plurality of rotated simulated reels forms an array of three adjacent simulated reels.

7. The method of claim 5, wherein the subset of the plurality of rotated simulated reels comprises three non-adjacent simulated reels.

8. The method of claim 5, wherein the skill-based game is a matching game, and wherein the winning pattern comprises a linear pattern across the plurality of simulated reels, the linear pattern including a set of matching symbols associated with the subset of the plurality of rotated simulated reels, and a predetermined combination of symbols in a row spanning a second subset of the plurality of rotated simulated reels.

9. The method of claim 1, wherein the adjusting comprises nudging the at least one rotated simulated reel upwards at least one space.

10. The method of claim 1, wherein the adjusting comprises nudging the at least one rotated simulated reel downwards at least one space.

11. A game device, comprising:

an interface;

an input device;

at least one processor; and at least one memory storing computer-executable instructions that, when executed by the at least one processor, cause the at least one processor to:

render, via the interface, a plurality of simulated reels associated with a skill-based game, each simulated reel comprising a plurality of symbols;

receive, via the input device, an indication from a player to participate in the skill-based game;

simulate a plurality of rotations respectively associated with the plurality of rendered simulated reels, each of the plurality of simulated rotations spanning a predetermined period of time and having a predetermined angular velocity;

render, via the interface, the plurality of rotated simulated reels during a respective simulated rotation;

render, via the interface, indicia associated with at least one of the plurality of rotated simulated reels, said indicia comprising a first directional indicia that represents a first direction of adjustment of a position of said at least one rotated simulated reel and a second directional indicia that represents a second direction of adjustment of the position of said at least one rotated simulated reel;

determine if symbols associated with the plurality of rotated simulated reels match a winning pattern of symbols; and assign a win to the player in response to a determination that the symbols match the winning pattern of symbols, and in response to a determination that the symbols do not match the winning pattern of symbols, receive a player selection of one of the directional indicia associated with said at least one rotated simulated reel of the subset of the plurality of rotated simulated reels, adjust the at least one rotated simulated reel based on the received user selection of the one of the directional indicia;

render, via the interface, a plurality of adjusted rotated simulated reels;

determine if second symbols associated with the plurality of adjusted rotated simulated reels match the winning pattern of symbols; and upon determining the symbols associated with the plurality of adjusted rotated simulated reels do not match a winning pattern of symbols, adding to a bonus amount a value based on a wager amount of the player for play of the skill-based game.

12. The game device of claim 11, wherein the plurality of simulated reels forms an array, and wherein the predetermined period increases with the position of a rotated simulated reel within the array.

13. The game device of claim 11, wherein the plurality of simulated reels is arranged in an array, and wherein the predetermined period decreases as the position of a rotated simulated within the array increases.

14. The game device of claim 11, wherein the plurality of simulated reels forms an array of five adjacent simulated reels, and wherein the symbols within the array are arranged in three rows and five columns.

15. The game device of claim 11, wherein the plurality of simulated reels forms an array of five adjacent simulated reels, and wherein a subset of the plurality of rotated simulated reels comprises three simulated reels within the array.

16. The game device of claim 15, wherein the skill-based game is a matching game, and wherein the winning pattern comprises a linear pattern across the plurality of simulated reels, the linear pattern including a set of matching symbols associated with the subset of the plurality of rotated simulated reels, and a predetermined combination of symbols in a row spanning a second subset of the plurality of rotated simulated reels.

17. The game device of claim 11, wherein the memory further stores computer-executable instructions that, when executed by the at least one processor, cause the at least one processor to adjust the at least one rotated simulated reel upwards at least one space.

18. The game device of claim 11, wherein the memory further stores computer-executable instructions that, when executed by the at least one processor, cause the at least one processor to adjust the at least one rotated simulated reel downwards at least one space.

19. At least one non-transitory computer-accessible storage medium having instructions encoded thereon that, in response to execution, cause a game device comprising at least one processor to perform operations comprising:

rendering a plurality of simulated reels associated with a skill-based game, each simulated reel comprising a plurality of symbols;

receiving an indication from a player to participate in the skill-based game;

simulating a plurality of rotations respectively associated with the plurality of rendered simulated reels, each of the plurality of simulated rotations spanning a predetermined period of time and having a predetermined angular velocity;

rendering indicia associated with at least one of the plurality of rotated simulated reels, said indicia comprising a first directional indicia that represents a first direction of adjustment of a position of said at least one rotated simulated reel and a second directional indicia that represents a second direction of adjustment of the position of said at least one rotated simulated reel;

determining if symbols associated with the plurality of rotated simulated reels match a winning pattern of symbols; and assigning a win to the player in response to ascertaining that the symbols match the winning pattern of symbols, and in response to ascertaining that the symbols do not match the winning pattern of symbols, receiving a user selection of one of the directional indicia associated with said at least one rotated simulated reel of the plurality of rotated simulated reels, adjusting the at least one rotated simulated reel based on the received user selected directional indicia;

rendering a plurality of adjusted rotated simulated reels, and determining if second symbols associated with the plurality of adjusted rotated simulated reels match a winning pattern of symbols; and upon determining the symbols associated with the plurality of adjusted rotated simulated reels do not match a winning pattern of symbols, adding to a bonus amount a value based on a wager amount of the player for play of the skill-based game.

20. The at least one non-transitory computer-accessible storage medium of claim 19, wherein the plurality of simulated reels forms an array, and wherein the predetermined period selectively increases with the position of a rotated simulated reel within the array, or decreases as the position of a rotated simulated reel within the array increases, relative to an adjacent reel.

21. A skill-based game, comprising:

a game terminal for displaying a plurality of simulated reels associated with a skill-based game, each simulated reel comprising a plurality of symbols;

a game processor for operating play of the skill-based game by rotating and displaying the plurality of simulated reels upon receiving, by the game terminal, an indication from a player to participate in the skill-based game;

the game processor configured for simulating a plurality of rotations of the plurality of simulated reels, each of the plurality of simulated rotations spanning a predetermined period of time and having a predetermined angular velocity;

a display on the game terminal of an indicia associated with at least one of the plurality of rotated simulated reels, said indicia comprising a first directional indicia that represents a first direction of adjustment of a position of said at least one rotated simulated reel and a second directional indicia that represents a second direction of adjustment of the position of said at least one rotated simulated reel;

whereby upon determining, by the game processor, if symbols associated with the plurality of rotated simulated reels match a winning pattern of symbols, awarding a prize to the player; and in response to ascertaining that the symbols do not match the winning pattern of symbols, the game processor configured for receiving a player selection of one of the directional indicia associated with said at least one rotated simulated reel of the plurality of rotated simulated reels, the game processor configured for adjusting the at least one rotated simulated reel based on the received user selection of the one of the directional indicia; and whereby upon determining, by the game processor, if symbols associated with the plurality of adjusted rotated simulated reels match the winning pattern of symbols, awarding a prize to the player and upon determining the symbols associated with the plurality of adjusted rotated simulated reels do not match a winning pattern of symbols, increasing a bonus amount of an initial predetermined value by a value based on a wager amount of the player for play of the skill-based game.

22. The method as recited in claim 1, wherein simulating of the plurality of rotations further comprises:

a first subset of simulated reels each having a first predetermined angular velocity which is substantially the same;

a second subset of simulated reels each having a second predetermined angular velocity which is substantially the same, wherein the second predetermined angular velocity is faster than the first predetermined angular velocity.

23. The method as recited in claim 1, wherein the reels of the second subset of simulated reels spin for a longer period of time than the simulated reels of the first subset of simulated reels.

24. The method of claim 1, further comprising the step of awarding the bonus amount to an account of the player.

25. The game device of claim 1, further comprising the step of awarding the bonus amount to an account of the player.

26. The at least one non-transitory computer-accessible storage medium of claim 19, further comprising awarding the bonus amount to an account of the player.

27. The skill-based game of claim 21, further comprising the game processor configured for awarding the bonus amount to an account of the player.

* * * * *